US008175276B2

(12) United States Patent
Tkacik et al.

(10) Patent No.: US 8,175,276 B2
(45) Date of Patent: May 8, 2012

(54) ENCRYPTION APPARATUS WITH DIVERSE KEY RETENTION SCHEMES

(75) Inventors: Thomas E. Tkacik, Phoenix, AZ (US); Asaf Ashkenazi, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1065 days.

(21) Appl. No.: 12/025,374

(22) Filed: Feb. 4, 2008

(65) Prior Publication Data
US 2009/0196418 A1 Aug. 6, 2009

(51) Int. Cl.
*H04L 9/00* (2006.01)
(52) U.S. Cl. ............ 380/277; 380/45; 380/46; 380/227; 380/286; 380/287; 713/171; 713/194; 705/71
(58) Field of Classification Search .............. 380/45–46, 380/227, 286–287, 277; 713/194, 171; 705/71
See application file for complete search history.

(56) References Cited

U.S. PATENT DOCUMENTS

| 5,081,676 | A | * | 1/1992 | Chou et al. ........................ 705/55 |
| 5,438,622 | A | * | 8/1995 | Normile et al. ................. 380/46 |
| 5,661,803 | A | * | 8/1997 | Cordery et al. ................. 705/60 |
| 5,687,237 | A | * | 11/1997 | Naclerio .......................... 380/29 |
| 5,787,172 | A | * | 7/1998 | Arnold ........................... 713/175 |
| 6,128,391 | A | * | 10/2000 | Denno et al. .................. 380/283 |
| 6,473,861 | B1 | * | 10/2002 | Stokes ........................... 713/193 |
| 6,598,166 | B1 | * | 7/2003 | Folmsbee ....................... 713/190 |
| 6,981,153 | B1 | * | 12/2005 | Pang et al. ..................... 713/194 |
| 6,996,547 | B1 | | 2/2006 | Tugenberg et al. |
| 7,103,782 | B1 | | 9/2006 | Tugenberg et al. |
| 2002/0108042 | A1 | * | 8/2002 | Oka et al. ....................... 713/175 |
| 2003/0090306 | A1 | * | 5/2003 | Saito .............................. 327/164 |
| 2006/0026417 | A1 | | 2/2006 | Furusawa et al. |
| 2006/0129848 | A1 | * | 6/2006 | Paksoy et al. ................. 713/193 |

FOREIGN PATENT DOCUMENTS

| WO | 2004038995 A1 | 5/2004 |
| WO | 2005114809 A2 | 12/2005 |

OTHER PUBLICATIONS

Encrypted key exchange: password-based protocols secure against dictionary attacks; Bellovin, S.M.; Merritt, M.; Research in Security and Privacy, 1992. Proceedings., 1992 IEEE Computer Society Symposium on (0-8186-2825-1) 1992.p. 84-84.*
Smith, Weingart, "Building a High-Performance, Programmable Secure Coprocessor," 1998.

(Continued)

*Primary Examiner* — April Shan
(74) *Attorney, Agent, or Firm* — Meschkow & Gresham, P.L.C.

(57) ABSTRACT

An encryption apparatus (14) includes a secure processing system (12) in the form of an integrated circuit. The secure processing system (12) includes an on-chip secure memory system (30). The secure memory system (30) includes a non-volatile, read-only, permanent key register (62) in which a permanent cryptographic key (64) is stored. The secure memory system (30) also includes a non-volatile, read-write, erasable key register (56) in which an erasable cryptographic key (60) is stored. Symmetric cryptographic operations take place in an encryption engine (46) using an operating cryptographic key (68) formed by combining (96) the permanent and erasable keys (64, 60). A tamper detection circuit (70) detects tampering and erases the erasable key (60) when a tamper event is detected.

20 Claims, 4 Drawing Sheets

OTHER PUBLICATIONS

Smith, Palmer, Weingart, "Using a High-Performance, Programmable Secure Coprocessor," 2nd International Conference on Financial Cryptography, Feb 1998.

Dyer, et al., "Application Support Architecture for a High-Performance, Programmable Secure Coprocessor," 22nd National Information Systems Security Conference, Oct. 1999.

"Silicon Solutions Safeguard Secret Data, Protect Intellectual Property, and Authenticate Hardware," Maxim Integrated Products, 2006.

"Application Note 2033: SRAM-Based Microcontroller Optimizes Security," Maxim Integrated Products, May 14, 2003.

"Whitepaper: M-Shield Mobile Security Technology—Making Wireless Secure," Texas Instruments, 2005.

"DS5250 High-Speed Secure Microcontroller," Maxim Integrated Products, 2006.

"DS5002FP Secure Microprocessor Chip," Maxim Integrated Products, 2006.

"Secure Microcontroller User's Guide," pp. 73-83, Maxim Integrated Products, 2003.

"Security Requirements for Cryptographic Modules," Federal Information Processing Standards Publication: FIPS PUB 140-2, May 25, 2001.

* cited by examiner

| SECURITY LEVEL | PERMANENT KEY REGISTER ←62 | ERASABLE KEY REGISTER ←56 |
|---|---|---|
| 0 | BLANK KEY ←64 | BLANK KEY ←84 |
| 1 | BLANK KEY ←64' | PRODUCT-UNIQUE ERASABLE CRYPTOGRAPHIC KEY ←60' |
| 2 | DEVICE-UNIQUE PERMANENT CRYPTOGRAPHIC KEY ←64" | BLANK KEY ←84 |
| 3 | BLANK KEY ←64' | DEVICE-UNIQUE ERASABLE CRYPTOGRAPHIC KEY ←60" |
| 4 | DEVICE-UNIQUE PERMANENT CRYPTOGRAPHIC KEY ←64" | DEVICE-UNIQUE ERASABLE CRYPTOGRAPHIC KEY ←60" |

SECURITY STYLE MAP

FIG. 3

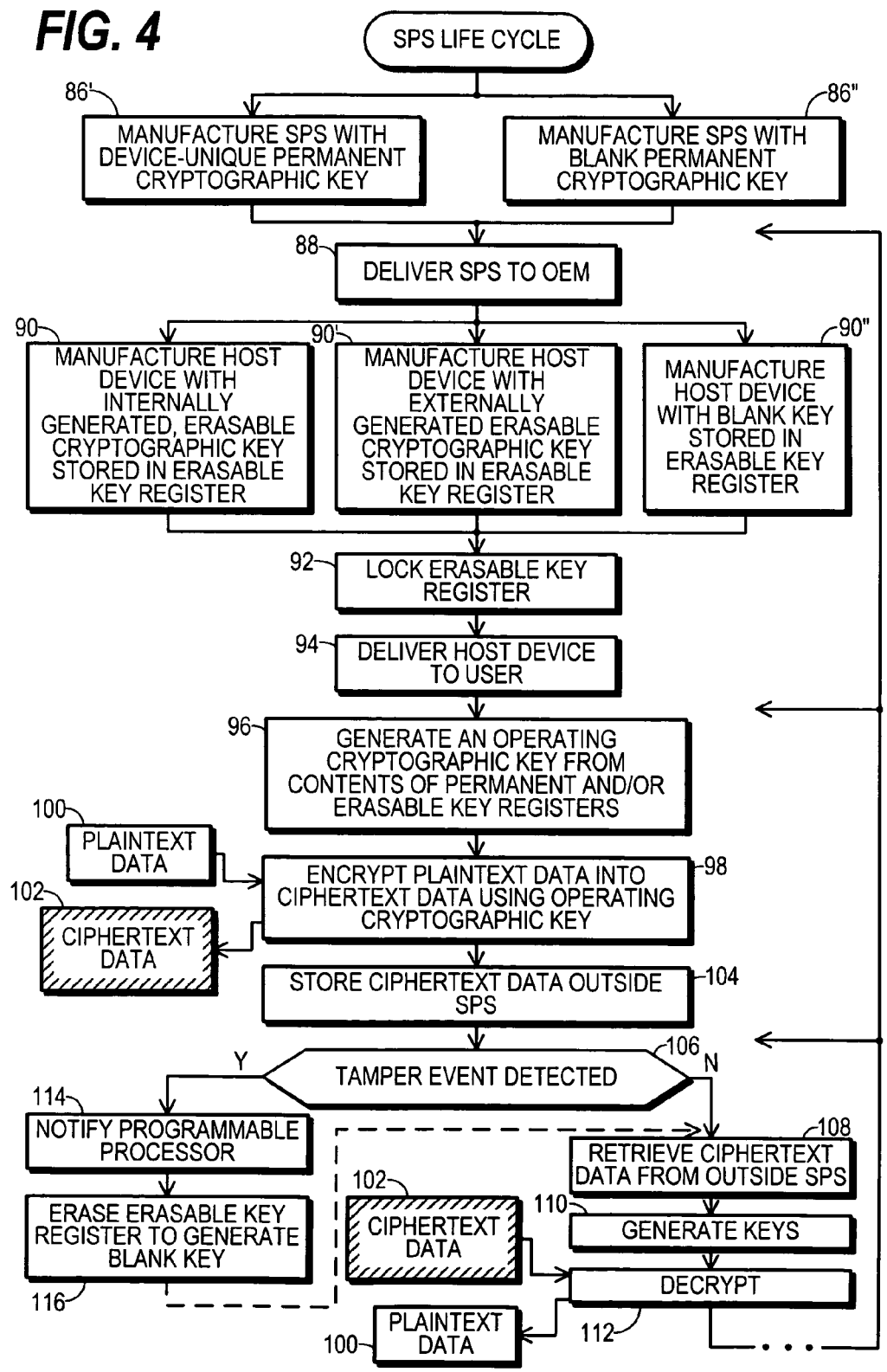

ENCRYPTION APPARATUS WITH DIVERSE KEY RETENTION SCHEMES

TECHNICAL FIELD OF THE INVENTION

The present invention generally relates to data security in electronic devices. More specifically, the present invention relates to the use of diverse schemes for retaining cryptographic keys within a single electronic device.

BACKGROUND OF THE INVENTION

End-user costs are a concern in connection with maintaining the security of electronic data. End-user costs refer to the collection of tangible and intangible burdens that an end user must endure in order to access the electronic data, yet maintain the security of the data. In some cases, security is maintained by binding the data to an electronic device which processes the data so that the data cannot be processed on a different electronic device. In some cases, security is maintained by storing the data in a manner that prevents the data from being disclosed and/or modified. And, in some cases security is maintained by detecting attempts to process, disclose, modify, or access the data in an unauthorized manner.

Often times, an electronic device that implements some sort of data-security style will be less user friendly than similar devices that do not implement data security or that implement a lower level data-security style. The reduction in user friendliness may be attributed to additional procedures, activities, steps, and time required for causing the electronic device to process the secure data and an increased likelihood that a user will not be able to access the secure data at all. In some situations, the reduction in user friendliness may be attributed to human security procedures that surround the use of the electronic device. Regardless, the implementation of a given security style often leads to end-user costs associated with blocked data access, increased frustration, increased time, reduced productivity, increased expenses for acquiring, operating, and maintaining secure electronic devices, and other security-related costs.

Often, an electronic device is designed to implement a particular data security style. The design process results in a sharp balance being struck between security level and end-user costs. One technique for striking this balance is to determine the end-user costs that may be tolerated, and then design the electronic device to implement as high a level of data security as is compatible with the tolerable end-user costs. Another technique for striking this balance is to determine a required level of data security, and then design the electronic device to implement as low a level of end-user costs as is compatible with the required data security level. Regardless of the technique, a need exists for increasing the level of data security provided by a given end-user cost.

While different industry groups have attempted to define standards with respect to data security for specific data processing applications, the implementation of data security across a variety of different applications is far from standardized. Different data processing applications have vastly different data security needs. Consequently, the balance between data security levels and end-user costs is likely to be struck differently for different applications. For example, a point-of-sale terminal may have different data security requirements from a cellular telephone, and both of these applications may have different data security requirements from a digital media player.

Conventional electronic components and devices intended for use in data security applications have been designed to provide a limited range of security levels. Accordingly, components and devices which may be suitable for one application can be entirely unsuitable for other applications. A wide proliferation of proprietary data-security components and devices for niche markets has developed. In other words, data-security applications have failed to experience the cost, reliability, ease-of-use, and other benefits achievable through mass market manufacturing techniques and experienced in connection with data processing applications that are not as security sensitive.

Moreover, conventional electronic components and devices intended for use in data security applications have been designed to provide static security levels. In other words, if a conventional device is asked to perform both a higher-level security-sensitive application and a lower-level security-sensitive application, security techniques suitable for the higher-level security-sensitive application are likely to be implemented for the entire device. This conventional technique unnecessarily increases end-user costs for the lower-level security-sensitive application. For example, a device configured to implement security appropriate for a higher-level application may become unusable if data tampering is detected, preventing even the lower-level security-sensitive application from being usable.

Accordingly, a need exists for an encryption apparatus that can benefit from mass-market manufacturing techniques, that can accommodate a wide range of security levels, that can accommodate dynamic security levels, and/or that can accommodate increased levels of data security without increased end-user costs.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a security style map describing different levels of data security achievable through the use of the secure processing system of FIG. 1; and FIG. 4 shows a flow chart of a representative life cycle of the secure processing system of FIG. 1.

DETAILED DESCRIPTION

Figure 1:
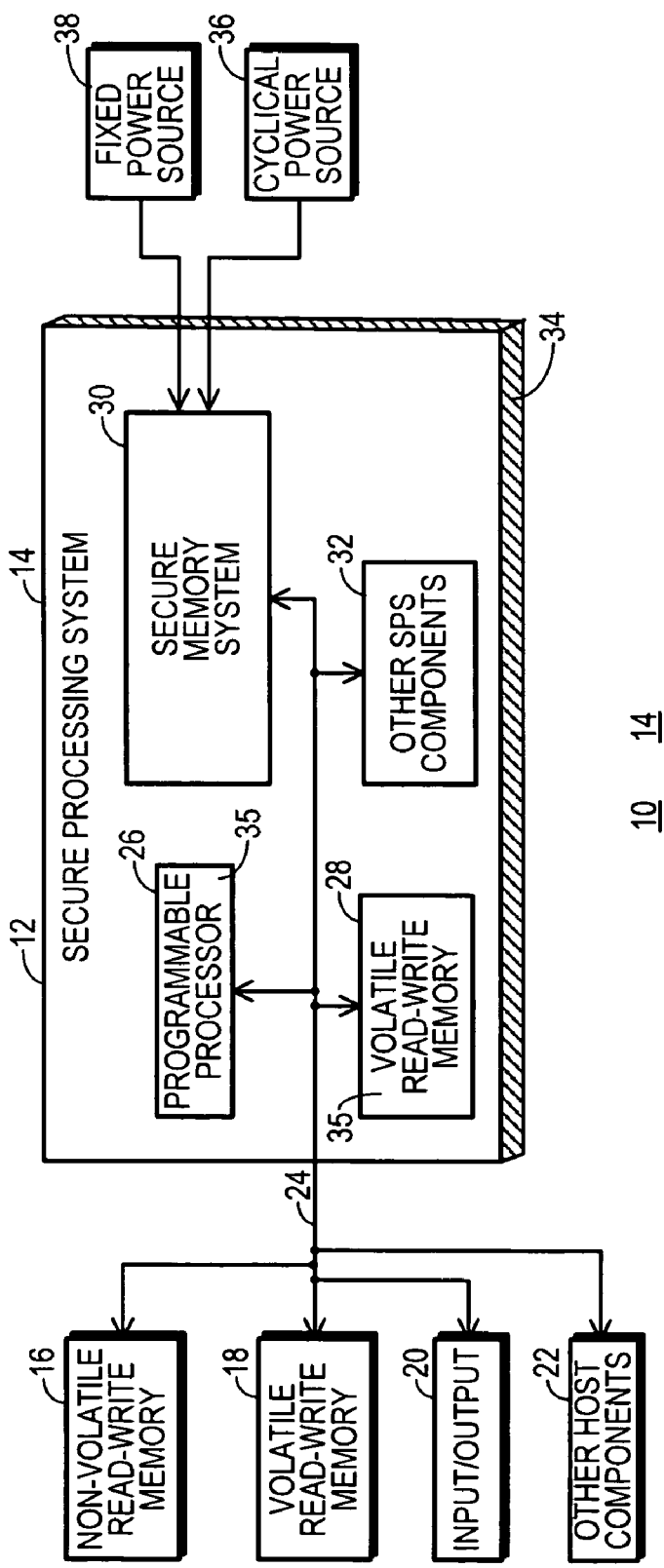
FIG. 1 shows a block diagram of a host device that utilizes a secure processing system.

FIG. 1 shows a block diagram of a host device 10 that utilizes a secure processing system 12. Secure processing system 12 is an encryption apparatus 14 because it performs data encryption and/or decryption operations. Likewise host device 10 is an encryption apparatus 14 because it performs data encryption and/or decryption operations.

Encryption apparatus 14 in the form of host device 10 represents an electronic device that includes provisions for maintaining the security of data that may be stored in, processed by, and/or communicated by host device 10. Host device 10 may be configured for any of a wide variety of different data-processing applications, including point-of-sale terminal, wireline or wireless telephony, radio, personal computer, laptop, handheld computer, workstation, digital media player, router, modem, industrial controller, and the like.

As depicted in FIG. 1, in addition to secure processing system 14, host device 10 may include a non-volatile read-write memory 16, a volatile read-write memory 18, an input/output section 20, and other host components 22 of a type and configuration understood to those skilled in the art of data processing and computerized devices. Memory 16, memory 18, section 20, and other components 22 couple together and to secure processing system 12 through a bus 24 that conveys data, addresses, and control signals.

Among other things, encryption apparatus 14 in the form of secure processing system 12 provides data security services, including the encryption and decryption of data, for host device 10. In the embodiment depicted in FIG. 1, secure processing system 12 provides other data processing services as well. For example, secure processing system 14 includes a programmable processor 26, which may be viewed as a central processing unit (CPU), processor, controller, microcontroller, microprocessor, or the like. Programmable processor 26 may, but is not required to, be the only programmable processor for host device 10.

A programmable processor, such as programmable processor 26, differs from an unprogrammable processor in that the software, programming instructions, or code it executes may be changed or augmented in some way after host device 10 has been manufactured. Security considerations for host device 10 are evaluated under the assumption that a programmable processor, such as programmable processor 26, may be vulnerable to malicious code, such as software viruses, trojans, worms, software bugs, and the like. Desirably, host device 10 is configured to minimize the likelihood of malicious code being executed on programmable processor 26, but no requirement exists for guaranteeing that programmable processor 26 is absolutely prevented from executing malicious code.

Programmable processor 26 couples to bus 24 as does a volatile read-write memory 28, a secure memory system 30, and other secure processing system (SPS) components 32. Desirably, processor 26, memory 28, secure memory system 30, and other SPS components 32 are all formed together on a common semiconductor substrate 34 and packaged as a single integrated circuit. In large part, secure processing system 12 provides security services through the operation of secure memory system 30, which is discussed below in more detail in FIGS. 2-4.

Memories 16, 18, and 28 are characterized in the embodiment depicted in FIG. 1 as being read-write memories. Those skilled in the art will appreciate that read-write memory, registers, and other read-write components are capable of being written to during the operation of host device 10 at least a number of times so that data previously stored therein is overwritten, and the newly stored data may then be read, at least until power is cycled off or the data are overwritten again. In contrast, for read-only or write-once memories, or one-time programmable memories, registers, or other read-only components (not shown) data are programmed or otherwise written into the components during the manufacturing stage and cannot thereafter be altered. The data stored in read-only components may be read during the operation of host device 10.

Those skilled in the art will appreciate that non-volatile memory, registers, and other non-volatile components, such as memory 16, are a form of component that retains data stored therein after power is cycled off and then back on. A wide variety of non-volatile memory devices, including magnetic and optical storage devices (e.g., hard drives, CD drives, DVD drives) EEPROM, flash memory, and the like are usable as non-volatile memory in host device 10. In contrast, volatile memory, such as memory 18 and memory 28 do not retain data stored therein after power is cycled off and then back on. A variety of volatile memory devices, including static and dynamic RAM, are usable as volatile memory in host device 10. Volatile memory with a battery backup configured so that power is not cycled off and then back on may also serve as non-volatile memory.

It is often inefficient to combine technologies that are used to form significant quantities of non-volatile memory on a common semiconductor substrate with technologies that form volatile memory, logic circuits, and processing circuits. Thus, in order to realize the cost and other benefits of mass market manufacturing techniques, secure processing system 12 configured in accordance with one embodiment is desirably manufactured using technologies that do not incorporate large quantities of non-volatile memory on substrate 34.

Sensitive data for which security services are provided should generally be protected from unauthorized disclosures and/or bound to use only on a particular host device 10 where the sensitive data reside. Accordingly, host device 10 desirably implements a secret key, or symmetric key, cryptographic system. In particular, host device 10 may encrypt plaintext data into ciphertext data within secure processing system 12, and then store the ciphertext data in non-volatile read-write memory 16. No need exists for storing plaintext data in any non-volatile memory within host device 10.

If desired, the plaintext data may be encrypted using a secret cryptographic key, also called a symmetric cryptographic key, which is a product-unique key so that the plaintext data is unusable on any other type of product. Or, the plaintext data may be encrypted using a device-unique secret cryptographic key so that the plaintext data is unusable on any other host device 10. The plaintext data is considered to be secure if only its ciphertext data counterpart is stored outside secure processing system 12, and may be erased or otherwise destroyed within secure processing system 12 after the ciphertext data has been generated and stored in non-volatile memory 16. When needed, the ciphertext data may be read back into secure processing system 12, decrypted back into the plaintext data using the same cryptographic key that was used in the previous encryption process, and then processed as desired. The movement of ciphertext data into and out of secure processing system 12 and other activities performed by secure processing system 12 may be controlled by programmable processor 26, as defined by programming code 35. Programming code 35 is executed by programmable processor 26 and may be stored in any one or more of memories 16, 18, 28 and/or other SPS components 32, or programming code 35 may be considered to be a part of programmable processor 26.

While host device 10 desirably implements a symmetric key cryptographic system, nothing prevents host device 10 from also being configured to implement an asymmetric key cryptographic system.

FIG. 1 depicts the use of two different power sources. Both a cyclical power source 36 and a fixed power source 38 couple to secure processing system 12, and particularly to secure memory system 30 of secure processing system 12 in the embodiment depicted in FIG. 1. Cyclical power source 36 is intended to provide the primary power for host device 10 and secure processing system 12. Cyclical power source 36 may be turned off so as to supply no voltage when host device 10 is not being used, and then turned back on when host device 10 is to be used. Cyclical power source 36 may be provided by a switched battery, by a power supply that draws energy from a public power distribution network or in any other way known to those skilled in the art. Fixed power source 38 may be provided by a battery that is hard wired or otherwise configured to supply a fixed voltage that is not removed through the operational life of host device 10. In other words, fixed power source 38 is not intended to be turned off and on. A Li-ion button battery may suffice for fixed power source 38.

Figure 2:
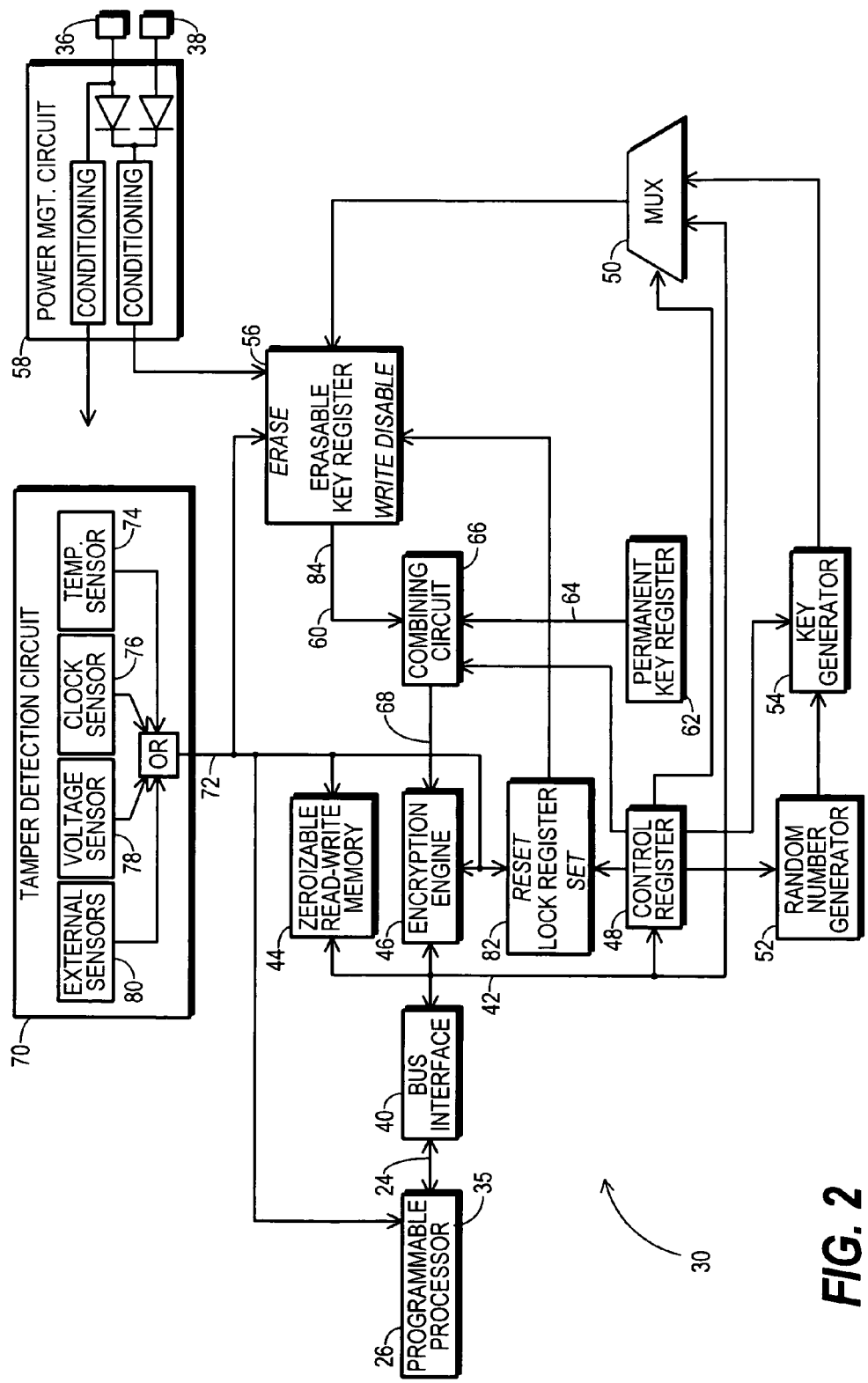
FIG. 2 shows a block diagram of a secure memory system portion of the secure processing system from FIG. 1.

FIG. 2 shows a block diagram of secure memory system 30 from secure processing system 12 along with programmable processor 26. Processor 26 couples through a bus interface 40 to a data bus 42 within secure memory system 30. Data bus 42 couples to a zeroizable read-write memory 44, an encryption engine 46, a control register 48, and a data input of a multiplexer (MUX) 50. Programmable processor 26 manages the transference of plaintext data and ciphertext data into and out of zeroizable memory 44 and encryption engine 46.

An unprogrammable random number generator 52 couples to control register 48 and a key generator 54, receiving control input from control register 48 and supplying random number data to key generator 54. Random number generator 52 is a hardware-implemented random number generator. No software or firmware control is required to be used by random number generator 52. But if any software or firmware control is used in random number generator 52, it is desirably implemented in read-only devices and cannot be altered after secure processing system 12 has been manufactured.

Key generator 54 also couples to and receives control input from control register 48. Key generator 54 and random number generator 52 together generate a secret cryptographic key compatible with the symmetric cryptographic algorithms implemented by encryption engine 46. This cryptographic key is an internally generated secret cryptographic key because it is generated within the confines of secure memory system 30. It is desirably inaccessible to and unreadable by programmable processor 26 after manufacture. Key generator 54 couples to a data input of multiplexer 50 and supplies the internally generated secret cryptographic key to multiplexer 50.

A selection input of multiplexer 50 couples to and receives control input from control register 48. A data output of multiplexer 50 couples to a data input of an erasable key register 56. Erasable key register 56 is configured as a read-write register and may be configured as a non-volatile register.

In particular, in one embodiment a power management circuit 58 couples to both of cyclical power source 36 and fixed power source 38. One output from power management circuit 58 supplies power from cyclical power source 36 to the vast majority of components of secure processing system 12. This power cycles off and on during the life cycle of host device 10 as cyclical power source 36 cycles off and on.

Another output of power management circuit 58 couples to erasable key register 56. Power management circuit 58 is configured so that the power for erasable key register 56 is supplied by cyclical power source 36 when cyclical power source 36 is switched on and by fixed power source 38 when cyclical power source 36 is switched off. In other words, power management circuit 58 desirably causes fixed power source 38 to function as a battery backup with respect to erasable key register 56. In this embodiment, power management circuit 58 causes erasable key register 56 to operate as a non-volatile register because it remains powered up throughout the normal life cycle of host device 10. A cryptographic key 60 stored in erasable key register 56 will not be erased but will be retained when cyclical power source 36 cycles off.

In another embodiment, host device 10 need not include fixed power source 38, and power to erasable key register 56 cycles with the cycling of power supplied by cyclical power source 36. Those skilled in the art will appreciate that cryptographic key 60 stored in erasable key register 56 may be erased when power is removed from erasable key register 56. In this embodiment, power management circuit 58 may be provided by conductors which connect either one of cyclical power source 36 or fixed power source 38 to the components of secure memory system 30.

A permanent key register 62 is configured as a non-volatile, read-only register. It is desirably programmed during the manufacturing process of secure processing system 12 and cannot thereafter be altered. In one embodiment, laser-scribed fuses formed using semiconductor processing techniques in the upper regions above semiconductor substrate 34 (FIG. 1) are burned during manufacture to permanently program a permanent secret cryptographic key 64 into permanent key register 62. In another embodiment, electronic fuses located in the lower regions above semiconductor substrate 34 are electronically burned and blocked against further programming during a test phase after manufacturing to program permanent cryptographic key 64. Desirably, permanent cryptographic key 64 is generated so as to be compatible with the symmetric or other cryptographic algorithms implemented by encryption engine 46, and this permanent cryptographic key 64 is deleted, erased, and otherwise destroyed in all records maintained at the manufacturer of secure processing system 12 immediately after it has been programmed into permanent key register 62.

A data output from erasable key register 56 couples to a first input of a combining circuit 66, and a data output from permanent key register 62 couples to a second input of combining circuit 66. Combining circuit 66 desirably generates an operating cryptographic key 68 from keys 60 and 64 stored in registers 56 and 62 using a cryptographically suitable combining operation, such as an exclusive-OR or an exclusive-NOR. An output of combining circuit 66 couples to encryption engine 46 and supplies operating cryptographic key 68 to encryption engine 46.

In one embodiment, combining circuit 66 may be controlled through programming code 35 executed by programmable processor 26 and data supplied through control register 48 to specify one of a variety of combining algorithms to apply. For example, combining circuit 66 may exclusively select a data output from permanent key register 62 to serve as operating cryptographic key 68, exclusively select a data output from erasable key register 56 to serve as operating cryptographic key 68, or implement another algorithm which causes operating cryptographic key 68 to be formed from the data output of both permanent key register 62 and erasable key register 56. In this embodiment, different security-sensitive applications operating on host device 10 may implement different levels of security, and the level of security implemented in host device 10 may dynamically change in accordance with different security-sensitive applications.

In the preferred embodiment, encryption engine 46 provides encryption logic circuitry configured to implement a symmetric cryptographic algorithm for the encryption of plaintext data into ciphertext data and for the decryption of the ciphertext data back into the plaintext data. The plaintext data are desirably stored in zeroizable memory 44, and destroyed as soon as no longer needed. The symmetric cryptographic algorithm performed by encryption engine 46 uses operating cryptographic key 68 to perform the encryption and decryption tasks in a manner understood to those skilled in the art. Those skilled in the art will appreciate that the same operating cryptographic key 68 that was used to encrypt plaintext data into ciphertext data is used to successfully decrypt the ciphertext data back into the plaintext data. Otherwise, a different operating cryptographic key 68 will cause the ciphertext data to decrypt unsuccessfully. A variety of encryption algorithms known to those skilled in the art may be implemented in encryption engine 46, including the Advanced Encryption Standard (AES), the Data Encryption Standard (DES), the triple Data Encryption Standard (3DES) and others; or, encryption engine 46 may implement a proprietary algorithm if desired.

As discussed above in connection with the internally generated cryptographic key 60, permanent cryptographic key 64 and operating cryptographic key 68 are unreadable by and inaccessible to programmable processor 26 after manufacture.

Secure memory system 30 also includes a tamper detection circuit 70. Tamper detection circuit 70 is configured to detect characteristics of the physical environment which suggest that secure processing system 12 might not be operating properly. One or more of such characteristics are likely to be experienced if a saboteur attempts to tamper with host device 10 in an effort to discover critical security parameters that are stored therein. Examples of such critical security parameters include erasable cryptographic key 60, permanent cryptographic key 64, and operating cryptographic key 68.

In one embodiment tamper detection circuit 70 includes a number of different sensors. The activation of any one of the sensors may cause a tamper signal 72 to activate. The sensors may include, for example, a temperature sensor 74, clock sensor 76, voltage sensor 78, and external sensors 80 integrated into the design of a circuit card or housing on which or in which secure processing system 12 may be located or included within secure processing system 12 itself. Any of the tamper detection techniques and circuits known by those skilled in the art may be incorporated, in whole or in part, within tamper detection circuit 70.

Tamper signal 72 is routed, directly or indirectly, from an output of tamper detection circuit 70 to an input of programmable processor 26, zeroizable memory 44, an erase input of erasable key register 56, and a reset input of a lock register 82, and/or an disabling input of encryption engine 46. In an alternate embodiment, tamper signal 72 is configured to cause power to be removed from erasable key register 56.

When a tamper event is detected by tamper detection circuit 70, tamper signal 72 activates. When tamper signal 72 activates, the contents of zeroizable memory 44 are destroyed (e.g., zeroized), lock register 82 may be reset, and encryption engine 46 may become disabled. In addition, processor 26 and any programming code 35 being executed thereby are informed of the tamper event by a suitable mechanism, such as through an interrupt. Processor 26 and any programming code 35 being executed thereby desirably perform an appropriate error handling routine, such as sounding an alarm or displaying an appropriate message, in response to the tamper event.

When a tamper signal 72 activates, the contents of erasable key register 56 are also erased. The erasure of the contents of erasable key register 56 causes erasable key register 56 to store a blank key 84. Desirably, blank key 84 has the same value that results when power is removed from erasable key register 56. But in any event, blank key 84 desirably exhibits a different value from erasable cryptographic key 60.

A control output from control register 48 couples to a set input of lock register 82. When a tamper signal 72 activates, lock register 82 becomes reset. An output of lock register 82 couples to a write disable input of erasable key register 56. When lock register 82 is reset, erasable key register 56 allows a cryptographic key to be written into it. Thus, when a tamper event occurs, any erasable cryptographic key 60 stored in erasable key register 56 is erased and converted into a blank key 84, but erasable key register 56 is placed in a state where blank key 84 may be overwritten.

In accordance with a preferred embodiment, during the manufacturing process erasable cryptographic key 60 is generated internally through the operation of unprogrammable random number generator 52 and written into erasable key register 56 or generated externally through the operation of programmable processor 26 rather than random number generator 52 and routed through data bus 42, multiplexer 50 and written into erasable key register 56. Then, control register 48 is controlled to set lock register 82 and prevent data within erasable key register 56 from being overwritten. Once lock register 82 is set, data stored within lock register 82 is prevented from being overwritten as well. It then takes a tamper event, whether intentional or unintentional, to erase erasable cryptographic key 60, to reset lock register 82, and to place erasable key register 56 in a state where another key may be written into it.

Those skilled in the art will appreciate that key registers 56 and 62 discussed herein may be configured to have multiple compartments to accommodate different keys and/or different key lengths that may be used in accordance with different cryptographic algorithms implemented by encryption engine 46. In one embodiment, erasable key register 56 may have multiple compartments to accommodate internally generated keys and externally generated keys, with multiplexer 50 alternately located between the data output of erasable key register 56 and combining circuit 66. These and other equivalent modifications which will be understood to those skilled in the art are intended to be included within the scope of the present invention.

Thus, secure memory system 30 utilizes diverse key retention schemes. One key retention scheme is implemented through permanent key register 62. Any permanent cryptographic key 64 stored in register 62 is permanently retained therein regardless of future power cycling events, regardless of future tamper events, and regardless of any future activities by processor 26, even under the control of malicious code. A different key retention scheme is implemented through erasable key register 56. Any erasable cryptographic key 60 stored in register 56 is retained therein, regardless of future power cycling events and regardless of any future activities by processor 26, but only until a tamper event is detected. And, operating cryptographic key 68, rather than keys 60 or 64, is used by encryption engine 46 for cryptographic activities. Operating cryptographic key 68 is formed by selecting and/or combining the keys retained in accordance with the two different key retention schemes.

FIG. 3 shows a security style map describing different levels of data security achievable through the use of the secure processing system 12. In particular, the diverse key retention schemes discussed above together permit different host devices 10 to implement a wide range of security styles, and/or permit a single host device 10 to implement different security styles as may be appropriate for different security applications.

Data security at a low level may be provided by using the above-discussed techniques and secure memory system 30 to program permanent key register 62 to store a blank permanent cryptographic key 64' and to program erasable key register 56 to store blank key 84. In this embodiment, fixed power source 38 (FIG. 1) may be used, but is not needed. If, for example, the blank keys exhibit values of all zeros, then effectively no ciphertext data is produced by encrypting plaintext data. The plaintext data are not bound to host device 10 and are easily discoverable in non-volatile memory 16. But tamper events are detected and reported through software executed by processor 26. And, neither tamper events nor failures in secure processing system 12 will block access to plaintext data because plaintext data may be recovered from non-volatile memory 16. This security style can provide a very low end-user cost.

Data security at a slightly higher level may be provided by using the above-discussed techniques and secure memory system 30 to program permanent key register 62 to store blank permanent cryptographic key 64' and to program erasable key register 56 to store a product-unique erasable cryptographic key 60'. Alternatively, a device-unique permanent cryptographic key 64" may be stored in permanent key register 62, and combining circuit 66 controlled to exclusively select product-unique erasable cryptographic key 60' for use as operating cryptographic key 68. Product-unique key 60' has the same value as other product-unique erasable cryptographic keys 60' in other host devices 10 that are the same product, but desirably not the same for other products. Ciphertext data are produced by encrypting plaintext data using cryptographic keys 60' and 64', or just key 60', as discussed above and then stored in non-volatile memory 16. In this example, the plaintext data are not bound to any specific host device 10, but are bound to a product for which there may be many host devices 10. The plaintext data are not generally discoverable within non-volatile memory 16. In the event of tampering, the plaintext data will be lost to the specific host device 10 affected because product-unique erasable cryptographic key 60' will be erased. But by transferring the ciphertext data from one host device 10 to another host device 10 that is the same product, the plaintext data may be recovered. This security style still provides a low end-user cost because plaintext data may be recovered and used on other host devices 10 that are the same product.

A still higher data security level may be provided by using the above-discussed techniques and secure memory system 30 to program permanent key register 62 to store a device-unique permanent cryptographic key 64" and to program or otherwise cause erasable key register 56 to store blank key 84. Alternatively, erasable key register 56 may store either a device-unique or product-unique key and combining circuit 66 may be controlled to exclusively select device-unique permanent cryptographic key 64" for use as operating cryptographic key 68. Device-unique key 64" has a unique value for each host device 10, regardless of whether host device 10 may be the same product as another host device 10. Those skilled in the art will appreciate that a device-unique key need not be guaranteed as being absolutely unique but that the device-unique key is desirably generated using a randomizing or other process that makes the likelihood of identical keys being produced twice unlikely to a cryptographically significant degree. Ciphertext data are produced by encrypting plaintext data using cryptographic keys 84 and 64", or just key 64", as discussed above, and desirably stored in non-volatile memory 16. In this example, the plaintext data are bound to the specific host device 10 where the encryption task takes place. The plaintext data are not discoverable within non-volatile memory 16. But in the event of tampering, the plaintext data are recoverable in the specific host device 10 affected by the tampering because device-unique permanent cryptographic key 64" is retained in spite of the tampering and because a blank key is stored in erasable key register 56. This security style provides a moderate end-user cost because plaintext data may be recovered after a tamper event occurs, but only in the same host device 10 to which the plaintext data has been bound. This security level may, for example, be deemed appropriate for a cell phone application.

Another higher data security level may be provided by using the above-discussed techniques and secure memory system 30 to program permanent key register 62 to store blank permanent cryptographic key 64' and to program erasable key register 56 to store a device-unique erasable cryptographic key 60". Alternatively, a device-unique permanent cryptographic key 64" may be stored in permanent key register 62, and combining circuit 66 controlled to exclusively select device-unique erasable cryptographic key 60" for use as operating cryptographic key 68. Ciphertext data are produced by encrypting plaintext data using cryptographic keys 60" and 64', or just key 60", as discussed above, and stored in non-volatile memory 16. In this example, the plaintext data are bound to the specific host device 10 where the encryption task takes place. The plaintext data are not discoverable within non-volatile memory 16. In the event of tampering, the plaintext data are not recoverable in any host device 10, including the host device 10 to which the data are bound because device-unique erasable cryptographic key 60" is erased and converted into a different value from that used to perform encryption tasks. This security style provides a high end-user cost because plaintext data cannot be recovered after a tamper event occurs, even in the same host device 10 to which the plaintext data had been bound. This security style is suitable, for example, for use in host devices 10 configured to conform to the Federal Information Processing Standards Publication entitled "*Security Requirements For Cryptographic Modules* 140-2" and for other data security applications. This security level may, for example, be deemed appropriate for a point-of-sale (POS) terminal application.

In accordance with one embodiment, host device 10 may implement two applications having different security level requirements. Thus, programming code 35 may cause combining circuit 66 to select an output from permanent key register 62 as operating cryptographic key 68 while host device 10 operates in accordance with a cell phone application, but select an output from erasable key register 56 while host device 10 operates in accordance with a POS application. A tampering event may prevent host device 10 from thereafter operating in accordance with a POS application, but would not prevent host device 10 from thereafter operating in accordance with a cell phone application.

A still higher security level may be provided by using the above-discussed techniques and secure memory system 30 to program permanent key register 62 to store device-unique permanent cryptographic key 64" and to program erasable key register 56 to store device-unique erasable cryptographic key 60". Ciphertext data are produced by encrypting plaintext data using cryptographic keys 60" and 64" as discussed above and desirably stored in non-volatile memory 16. The plaintext data are bound to the specific host device 10 where the encryption task takes place. The plaintext data are not discoverable within non-volatile memory 16. In the event of tampering, the plaintext data are not recoverable in any host device 10, including the host device 10 to which the data are bound because device-unique erasable cryptographic key 60" is erased and converted into a different value from that used to perform encryption tasks. Operating cryptographic key 68 is not saved within secure processing system 12 but generated at combining circuit 66 as needed. Moreover, the two different device-unique keys 60" and 64" combined to make operating cryptographic key 68 can be generated at two different times and in two different places by two different organizations, making the discovery of both extremely unlikely. This security style provides virtually the same high end-user cost as when a blank key 64' is used in permanent key register 62, but achieves a higher level of security. This security style is also suitable for use in host devices 10 configured to conform to the Federal Information Processing Standards Publication entitled "*Security Requirements For Cryptographic Modules 140-2*" and for other data security applications.

Those skilled in the art will appreciate that FIG. 3 presents only a representative sampling of security styles and that the security styles presented in FIG. 3 may be augmented with other security features to further enhance the data security flexibility of encrypting apparatus 14.

FIG. 4 shows a flow chart of a representative life cycle of encryption apparatus 14, as provided by secure processing system (SPS) 12 and by host device 10. The life cycle of encryption apparatus 14 begins with the manufacturing of secure processing system (SPS) 12, which may be performed in accordance with either of at least two different embodiments. SPS 12 is manufactured on substrate 34 (FIG. 1) in accordance with integrated circuit semiconductor manufacturing techniques. In one manufacturing embodiment, permanent key register 62 (FIG. 2) is programmed in a task 86' to store device-unique cryptographic key 64" (FIG. 3). Desirably, the manufacturer destroys any record of the particular device-unique cryptographic key 64" stored in any SPS 12 as soon as permanent key register 62 has been programmed. In the other manufacturing embodiment, permanent key register 62 is programmed in a task 86" to store blank cryptographic key 64' (FIG. 3). Blank cryptographic key 64' may have the same value for an entire population of host devices 10.

Following either embodiment, SPS 12 is delivered to an original equipment manufacturer (OEM) during a task 88 where host device 10 is manufactured using SPS 12. Desirably, the OEM is a different organization than the manufacturer, even if within the same company, and is desirably located at a different place than where the manufacturer is located. The likelihood of a saboteur discovering cryptographic keys created by two different organizations at two different locations, in spite of each organization taking care to prevent the disclosure of the keys is extremely remote.

The manufacturing of host device 10 may take place in accordance with any of at least three different embodiments, as shown in FIG. 4. In a first embodiment, at a task 90 the OEM causes the internally generated, device-unique, erasable cryptographic key 60" to be stored in erasable key register 56, and then locks lock register 82 at a task 92. In a second embodiment, at a task 90' the OEM uses an externally generated erasable cryptographic key 60 to be stored in erasable key register 56, and then locks lock register 82 at task 92. The externally-generated erasable cryptographic key 60 may be either a product-unique key 60' or a device-unique key 60". The first of these two embodiments is somewhat more secure than the second because no human or external device can reasonably discover the internally generated erasable cryptographic key 60", whereas an externally generated erasable cryptographic key 60' or 60" is subject to discovery. In a third embodiment, at a task 90" the OEM causes blank key 84 to be stored in erasable key register 56.

Accordingly, the different embodiments that allow for different permanent and erasable keys to be stored in SPS 12 at different manufacturing stages allow host device 10 to be configured in accordance with any one of a wide variety of security styles, as discussed above in connection with FIG. 3. Moreover, in one embodiment a single host device 10 may be configured to dynamically implement more than one type of security style.

Next, in a task 94 host device 10 is delivered to an end user. Under the control of the end user, host device 10 continues to store cryptographic keys in permanent key register 62, and in erasable key register 56. Eventually, host device 10 performs a task 96 in accordance with the normal operation of host device 10 by or on behalf of the end user. In task 96, combining circuit 66 generates operating cryptographic key 68 from one or both of the keys stored in permanent key register 62 and erasable key register 56. As discussed above, one of a wide variety of security styles will result from the different types of keys that may have been stored in registers 62 and 56. Following task 96, host device 10 performs a task 98 to encrypt plaintext data 100 into ciphertext data 102 using the operating cryptographic key 68 just generated in task 96. The source, purpose, or use of the plaintext data is not important to the operation of the life cycle described by FIG. 4.

Following task 98, host device 10 stores the ciphertext data 102 just generated in a location outside SPS 12. Ciphertext data 102 need not be stored in a secure location and may, for example be stored in non-volatile memory 16 (FIG. 1). Next, FIG. 4 depicts a query task 106 to denote the operation of tamper detection circuit 70. As indicated for task 106, if no tampering has been detected, a task 108 is performed at some point following task 104, and perhaps long after the performance of task 104, to retrieve ciphertext data 102 from outside SPS 12. Then, in a task 110 operating cryptographic key 68 is regenerated from one or both of the keys stored in permanent key register 62 and erasable key register 56. Since no tampering has been detected, any erasable cryptographic key 60 has not been erased, and the very same operating cryptographic key 68 used above in task 98 is regenerated. Following task 110 a task 112 successfully decrypts ciphertext data 102 back into the plaintext data 100.

FIG. 4 uses ellipsis in the program flow following task 112 to denote the performance of additional tasks that are not relevant to the life cycle depicted in FIG. 4. Such additional tasks presumably include tasks for using plaintext data 100 for some purpose and desirably include a task for destroying plaintext data 100 when that purpose has been accomplished. Eventually, program flow returns to a previous point in the life cycle. In the normal operation of host device 10, program control will return to task 106 to continue monitoring for tamper events in preparation for a subsequent request to decrypt ciphertext data 102 or return to task 96 to encrypt other plaintext data.

When program control returns to task 96, a different security-sensitive application may be executed, and this different application may cause a different algorithm to be performed by combination circuit 66 for generating keys in tasks 96 and 110. In one example, a lesser-security-sensitive application may cause combination circuit 66 to exclusively select permanent cryptographic key 64 for use as operating cryptographic key 68. Thus, if a previous tamper event has been detected and erasable cryptographic key 60 has been erased, the lesser-security sensitive application will still function on host device 10.

When task 106 detects a tamper event, a task 114 indicates that programmable processor 26 is notified of the tamper event so that an appropriate error handling routine may be executed. And, in conjunction with task 114 a task 116 signifies the erasure of any erasable cryptographic key 60 stored in erasable key register 56 to generate blank key 84. This erasure then prevents the same operating cryptographic key 68 previously used in any iteration of task 98 from being generated again in combining circuit 66. On the other hand, if blank cryptographic key 84 was previously stored in erasable key register 56, then the erasure operation of task 116 will have no effect, and the same operating cryptographic key 68 previously used in any iteration of task 98 will continue to be generated in combining circuit 66.

Following task 116, program control may eventually flow to task 108 to decrypt ciphertext data 102. FIG. 4 depicts this flow as a dotted line because nothing requires this particular program sequence to occur. For example, an error handling routine may preclude it from occurring. But nothing requires the software executed by programmable processor 26 to be absolutely free from malicious code. Accordingly, no security violation results from engaging in a decrypting activity on ciphertext data 102 after a tamper event has been detected. The decrypting activity will simply be unsuccessful. In particular, if an erasable cryptographic key 60 was erased in task 116, then the operating cryptographic key 68 generated in task 110 will have a different value from the one previously generated during task 96. This will cause the decryption in task 112 to be unsuccessful. Plaintext data 100 will not be regenerated. Following task 112, program control may desirably flow back to task 88 in the event of an unsuccessful decryption to return host device 10 to its manufacturer so that the host device 10 may be re-provisioned with a new erasable cryptographic key 60.

In summary, at least one embodiment of the present invention provides an improved encryption apparatus with diverse key retention schemes. In at least one embodiment of the present invention an extensive selection of security styles are provided to implement a wide range in security levels. In at least one embodiment of the present invention, an encryption apparatus is provided that can accommodate a large variety of data security applications and experience the benefits of mass-market manufacturing techniques. And, in at least one embodiment of the present invention, improved data security is provided with no increase in end-user cost.

Although the preferred embodiments of the invention have been illustrated and described in detail, it will be readily apparent to those skilled in the art that various modifications may be made therein without departing from the spirit of the invention or from the scope of the appended claims.

What is claimed is:

1. An encryption apparatus with diverse key retention schemes comprising:
   a first key register, configured as a non-volatile, read-only register, for storing a permanent cryptographic key;
   a second key register, configured as a read-write register, for storing one of a blank key and an erasable cryptographic key;
   a combining circuit coupled to said first and second key registers for generating an operating cryptographic key from said permanent cryptographic key and said one of said blank key and said erasable cryptographic key;
   an encryption engine coupled to said combining circuit and configured to encrypt plaintext data into ciphertext data using said operating cryptographic key and to decrypt said ciphertext data into said plaintext data using said operating cryptographic key;
   a read-write memory configured to store programming code; and
   a processor coupled to said encryption engine and to said read-write memory, said processor being configured to operate in accordance with said programming code to manage transference of said plaintext data and said ciphertext data into and out of said encryption engine;
   wherein said first key register, said combining circuit, and said encryption engine are collectively configured so that said permanent cryptographic key and said operating cryptographic key are inaccessible to said processor.

2. An encryption apparatus as claimed in claim 1 additionally comprising a tamper detection circuit coupled to said second key register and configured to erase said erasable cryptographic key upon the detection of a tamper event.

3. An encryption apparatus as claimed in claim 2 wherein:
   said second key register is configured so that said second key register stores said blank key when said erasable cryptographic key has been erased;
   said operating cryptographic key is a first operating cryptographic key when said second key register stores said erasable cryptographic key; and
   said combining circuit is configured to generate a second operating cryptographic key when said second key register stores said blank key, said second operating cryptographic key exhibiting a different value from said first operating cryptographic key.

4. An encryption apparatus as claimed in claim 1 wherein said combining circuit is configured to select one of said permanent cryptographic key and said erasable cryptographic key for use as said operating cryptographic key.

5. An encryption apparatus as claimed in claim 1 additionally comprising:
   a lock register coupled to said second key register, said lock register being configured so that, when set, said lock register prevents data within said lock register and said erasable cryptographic key from being overwritten; and
   a tamper detection circuit coupled to said second key register and said lock register, said tamper detection circuit being configured to erase said erasable cryptographic key upon the detection of a tamper event.

6. An encryption apparatus as claimed in claim 1 additionally comprising an unprogrammable random number generator coupled to said second key register and configured to generate said erasable cryptographic key.

7. An encryption apparatus as claimed in claim 6 wherein said second key register is programmed with said erasable cryptographic key from one of said processor and said unprogrammable random number generator.

8. An encryption apparatus as claimed in claim 1 wherein said first key register is configured so that said permanent cryptographic key is a device-unique key.

9. An encryption apparatus as claimed in claim 1 wherein said second key register is configured so that said erasable cryptographic key is a device-unique key.

10. An encryption apparatus as claimed in claim 9 wherein said first key register is configured so that said permanent cryptographic key is a device-unique key.

11. An encryption apparatus as claimed in claim 1 wherein:
    said first key register is configured so that said permanent cryptographic key is a blank key; and
    said combining circuit is configured to generate said operating cryptographic key when said erasable cryptographic key is combined with said blank key.

12. An encryption apparatus as claimed in claim 1 wherein:
    said first key register, said second key register, said combining circuit, and said encryption engine are collectively configured so that said permanent cryptographic key, said erasable cryptographic key, and said operating cryptographic key are each unreadable by said processor.

13. An encryption apparatus as claimed in claim 1 wherein said encryption engine is configured to use said operating cryptographic key as a secret key.

14. A method of operating an encryption apparatus with diverse key retention schemes, said method comprising:
    storing a permanent cryptographic key in a first non-volatile key register, said first key register being a read-only register;

storing an erasable cryptographic key in a second non-volatile key register, said second register being a read-write register;

generating an operating cryptographic key from said permanent cryptographic key and said erasable cryptographic key;

encrypting plaintext data into ciphertext data using said operating cryptographic key and using a processor configured to operate in accordance with programming code stored in a read-write memory to manage transference of said plaintext data into an encryption engine;

decrypting said ciphertext data into said plaintext data using said operating cryptographic key and using said processor configured to operate in accordance with said programming code to manage transference of said ciphertext data into said encryption engine;

keeping said permanent cryptographic key and said operating cryptographic key inaccessible to said processor;

monitoring for a tamper event; and erasing said erasable cryptographic key when said tamper event is detected so that said second key register then stores a blank key.

15. A method as claimed in claim 14 wherein:

said operating cryptographic key is a first operating cryptographic key; and said method additionally comprises combining said blank key with said permanent cryptographic key to generate a second operating cryptographic key, wherein said second operating cryptographic key is unusable for decrypting said ciphertext data into said plaintext data.

16. A method as claimed in claim 14 wherein said erasing activity prevents a first security-sensitive application which uses said erasable cryptographic key from functioning but does not prevent a second security-sensitive application which utilizes said permanent cryptographic key from functioning.

17. A method as claimed in claim 14 additionally comprising, prior to said storing activity, generating said erasable cryptographic key in response to data provided by an unprogrammable random number generator.

18. An encryption apparatus with diverse key retention schemes comprising:

a first key register, configured as a non-volatile, read-only register, for storing a permanent cryptographic key;

a second key register, configured as a non-volatile, read-write register, for storing an erasable cryptographic key;

a tamper detection circuit coupled to said second key register and configured to erase said erasable cryptographic key to form a blank key upon the detection of a tamper event;

a combining circuit coupled to said first and second key registers for generating a first operating cryptographic key from said permanent cryptographic key and said erasable cryptographic key and for generating a second operating cryptographic key from said permanent cryptographic key and said blank key; and an encryption engine coupled to said combining circuit and configured to encrypt plaintext data into ciphertext data using said first operating cryptographic key, to successfully decrypt said ciphertext data into said plaintext data when using said first operating cryptographic key, and to unsuccessfully decrypt said ciphertext data when using said second operating cryptographic key;

a read-write memory configured to store programming code; and a processor coupled to said encryption engine and to said read-write memory, said processor being configured to operate in accordance with said programming code to manage transference of said plaintext data and said ciphertext data into and out of said encryption engine;

wherein said first key register, said combining circuit, and said encryption engine are collectively configured so that said permanent cryptographic key and said operating cryptographic key are inaccessible to said processor.

19. An encryption apparatus as claimed in claim 18 wherein:

said second key register receives said erasable cryptographic key from one of said processor and an unprogrammable random number generator.

20. A method as claimed in claim 14 wherein said erasable cryptographic key stored in said second key register is received at said second key register from one of said processor and an unprogrammable random number generator.

* * * * *